United States Patent
Kadowaki et al.

(10) Patent No.: US 7,551,290 B2
(45) Date of Patent: Jun. 23, 2009

(54) ABSOLUTE POSITION MEASUREMENT APPARATUS

(75) Inventors: Hidejiro Kadowaki, Kanagawa-ken (JP); Ko Ishizuka, Saitama-ken (JP); Shigeki Kato, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 11/459,851

(22) Filed: Jul. 25, 2006

(65) Prior Publication Data
US 2007/0024862 A1 Feb. 1, 2007

(30) Foreign Application Priority Data
Jul. 28, 2005 (JP) ............................. 2005-218980

(51) Int. Cl.
*G01B 9/02* (2006.01)
(52) U.S. Cl. ...................................... 356/493
(58) Field of Classification Search ................ 356/493, 356/498, 487, 496, 499, 491, 492, 494, 495
See application file for complete search history.

(56) References Cited

U.S. PATENT DOCUMENTS

| | | | | |
|---|---|---|---|---|
| 4,907,886 | A * | 3/1990 | Dandliker | 356/487 |
| 5,784,161 | A * | 7/1998 | Bechstein et al. | 356/487 |
| 6,181,430 | B1 * | 1/2001 | Meyer et al. | 356/495 |
| 6,529,279 | B2 * | 3/2003 | de Groot et al. | 356/517 |
| 6,570,660 | B2 * | 5/2003 | Ishizuka et al. | 356/494 |
| 6,618,218 | B1 | 9/2003 | Kadowaki | |
| 6,914,682 | B2 * | 7/2005 | Kato | 356/493 |
| 7,292,347 | B2 * | 11/2007 | Tobiason et al. | 356/498 |
| 7,298,493 | B2 * | 11/2007 | Ranalli | 356/493 |
| 7,391,521 | B2 * | 6/2008 | Ishizuka | 356/493 |
| 2002/0021448 | A1 * | 2/2002 | Ishizuka et al. | 356/488 |
| 2003/0081222 | A1 * | 5/2003 | Kato | 356/495 |
| 2003/0112444 | A1 | 6/2003 | Yang | |
| 2003/0227631 | A1 | 12/2003 | Rollings | |

(Continued)

FOREIGN PATENT DOCUMENTS

JP     2001-76325     3/2001

OTHER PUBLICATIONS

Akiko Hirai, Hirakazu Matsumoto: "High-sensitivity surface-profile measurement by heterodyne white-light interferometer" Optical Engineering, vol. 40, No. 3, Mar. 2001 pp. 387-391, XP002406785 fig 3 p. 388-p. 389.

(Continued)

*Primary Examiner*—Gregory J Toatley, Jr.
*Assistant Examiner*—Scott M Richey
(74) *Attorney, Agent, or Firm*—Canon USA Inc IP Div

(57) ABSTRACT

A first beam having high coherence and a second beam having low coherence are multiplexed onto the same optical axis. This multiplexed beam is split into first and second multiplexed beams. The first multiplexed beam is directed towards a measurement reflection plane of an object to be measured, and the second multiplexed beam is directed towards a reference plane. The first and second multiplexed beams that are reflected from the measurement reflection plane and the reference plane, respectively, are multiplexed to cause the first beams to interfere with each other and the second beams to interfere with each other. Calculations are carried out to determine a measurement origin on the basis of the first and second interference signals obtained from the first and second beams, respectively.

9 Claims, 9 Drawing Sheets

U.S. PATENT DOCUMENTS

| | | | |
|---|---|---|---|
| 2004/0141184 A1 | 7/2004 | Ueki | |
| 2005/0007598 A1* | 1/2005 | Ishizuka | 356/499 |
| 2007/0024863 A1* | 2/2007 | Kadowaki et al. | 356/498 |
| 2007/0103694 A1* | 5/2007 | Kato | 356/482 |
| 2007/0195330 A1* | 8/2007 | Ohashi et al. | 356/498 |

OTHER PUBLICATIONS

Dai Xiaoli et al: "High-accuracy absolute distance measurement by means of wavelength scanning heterodyne interferometry" Measurement Science and Technology, IOP, Bristol, GB,vol. 9, No. 7, Jul. 1, 1998 pp. 1031-1035, XP002406782 ISSN: 0957-0233.

* cited by examiner

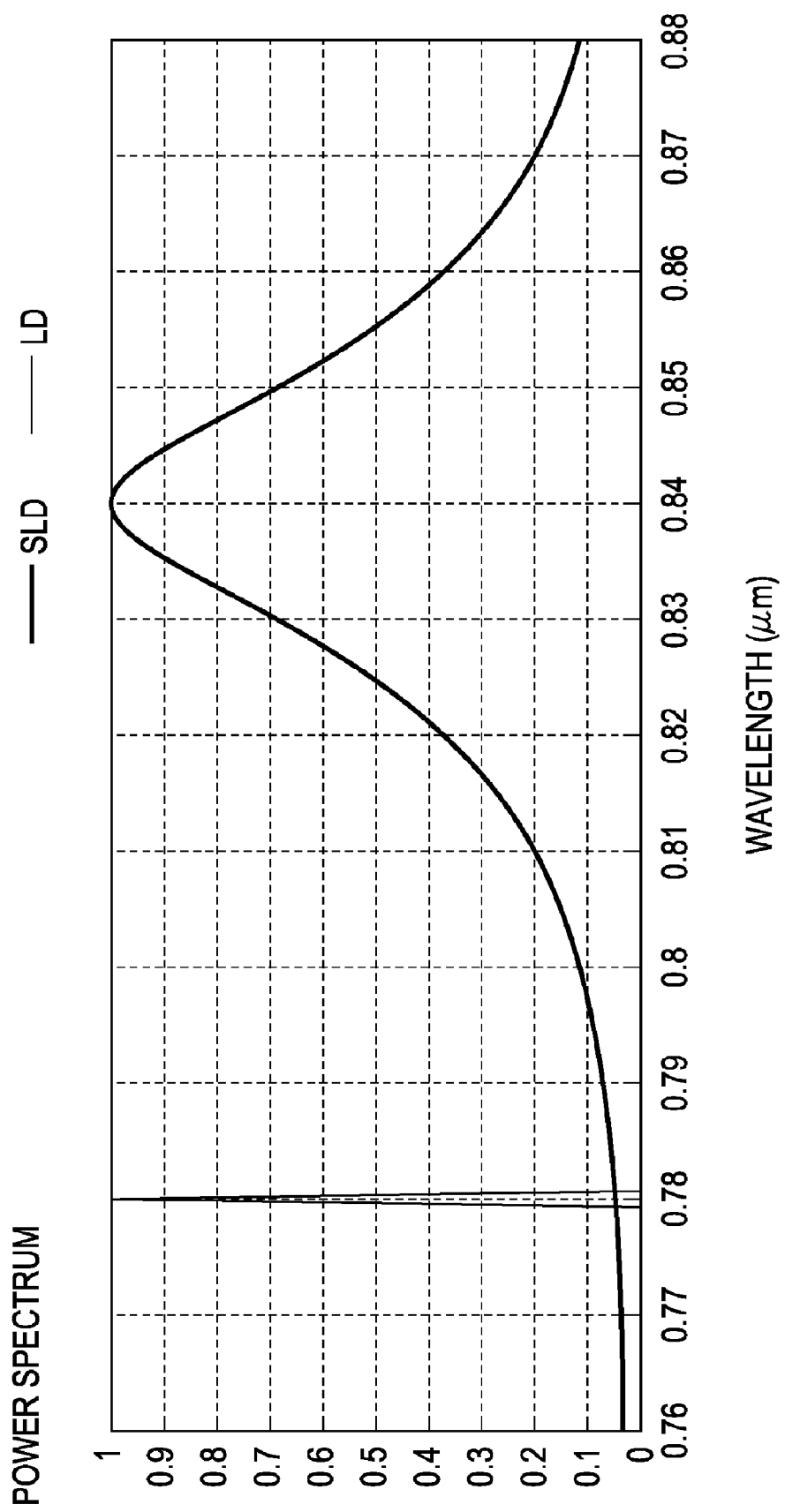

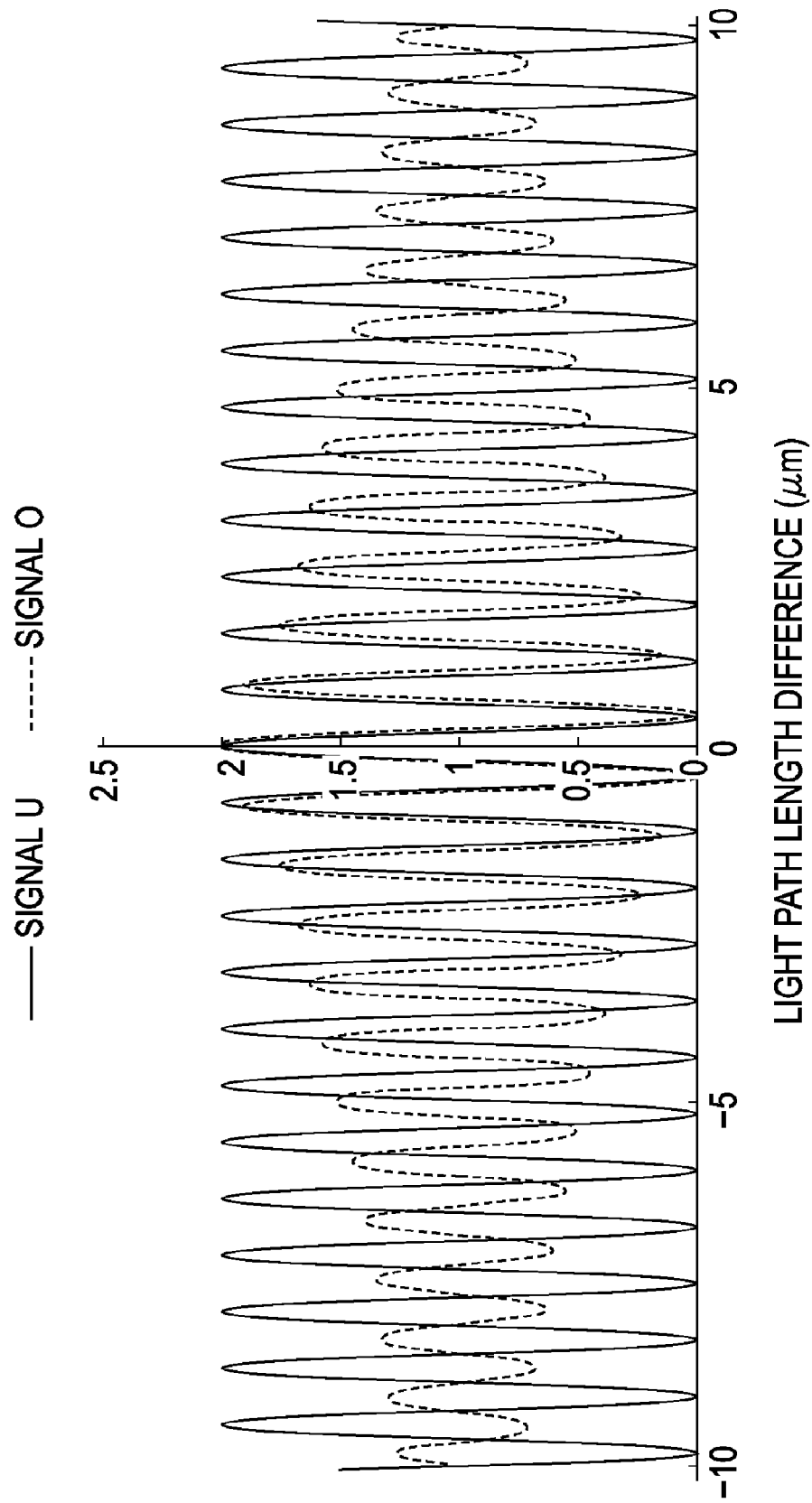

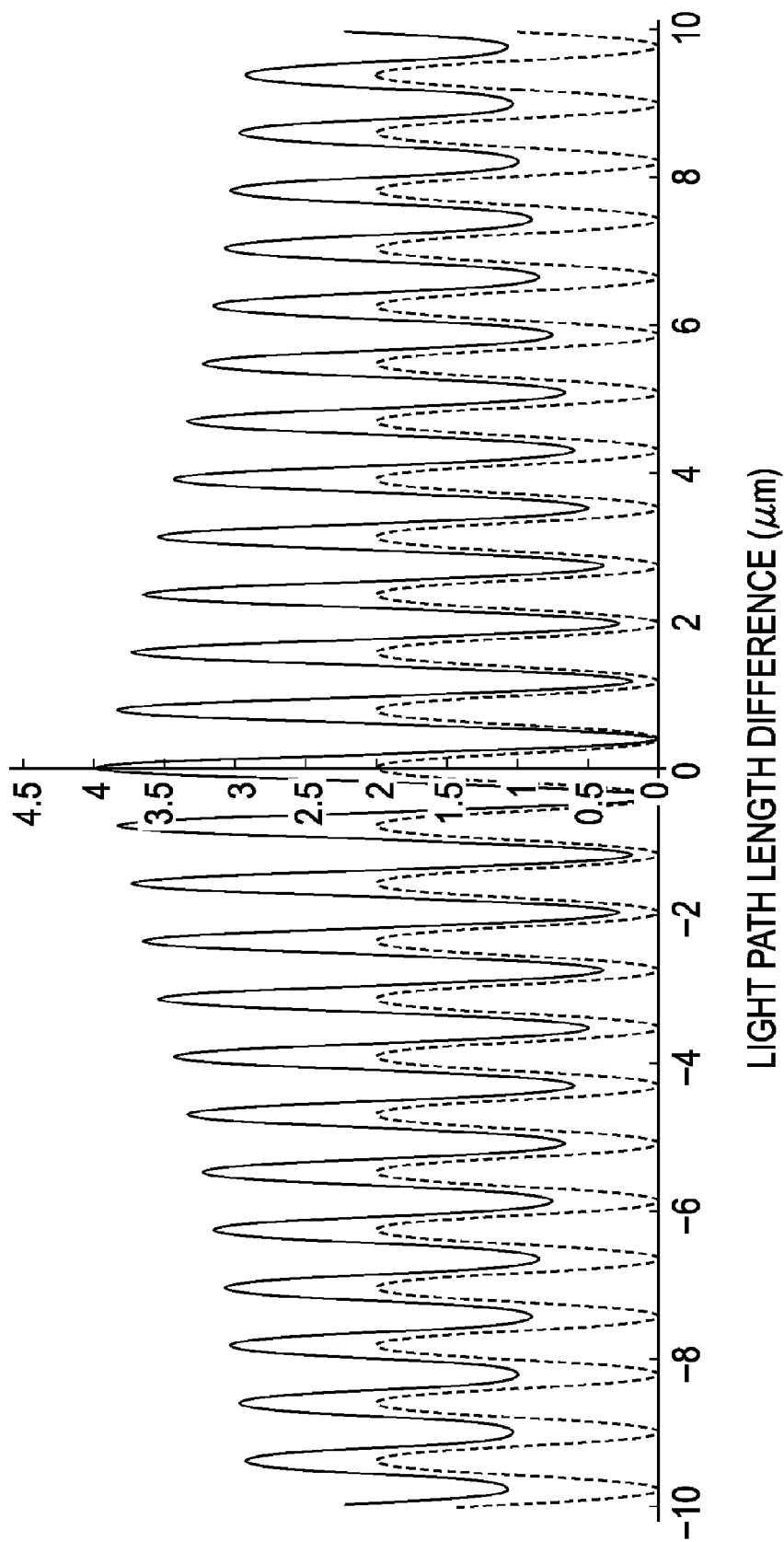

ABSOLUTE POSITION MEASUREMENT APPARATUS

BACKGROUND OF THE INVENTION

1. Field of the Invention

The present invention relates to an interference measurement apparatus capable of noncontact detection of position change information of an object. It relates particularly, though not exclusively, to an interference measurement apparatus suitable for detecting absolute position shift information by adding a position as an origin when detecting displacement information.

2. Description of the Related Art

For a measurement apparatus capable of measuring length with accuracy and resolution on the order of nanometers, a laser interference measurement apparatus, such as a Michelson interference apparatus using a laser beam, is often used.

Since an interference wave generated by the displacement of the object being measured is a sine wave, a laser interference measurement apparatus can count the wave number of the sine wave and detect the phase of the sine wave to measure the amount of displacement at an accuracy and resolution of the order of nanometers.

Japanese Patent Laid-Open No. 2001-76325 describes an apparatus configured to obtain displacement information (position information) of a measurement plane by using an interference signal obtained by a Michelson interference apparatus.

The displacement detection apparatus described in Japanese Patent Laid-Open No. 2001-76325 uses optical interference to detect displacement information of a measurement plane provided on a magnetic head arm.

More specifically, a probe instruction arm for alignment is provided coaxial to the rotational shaft of the magnetic head arm.

On the probe instruction arm, an optical position detection sensor unit configured to detect whether or not the end surface (i.e., measurement plane) of the magnetic head arm is at a desirable position.

The optical position detection sensor unit includes a detection system configured to align the side surface of the magnetic head arm by using an interference signal. The detection system includes a quarter wave plate, a phase diffraction grating, and a light-receiving element.

In addition, a focus detection optical system including a polarizing plate, a condenser lens, and a quadripartite sensor is provided to detect position information on the measurement plane in the direction of the optical axis.

The output signal of an interference measurement apparatus obtained by carrying out laser interference is a sine wave. Thus, measurement can be carried out at a resolution on the order of nanometers based on the wave number and phase. However, the absolute position cannot be determined merely by displacement. Therefore, to obtain absolute displacement information of the object being measured, an additional reference point (i.e., origin) must be provided and the relative position of the object with respect to this reference point must be determined.

In this case, to determine the accurate absolute position, the reference point (i.e., origin) must be provided at an accuracy surpassing the wavelength (0.2 μm for the example above) of the output sine wave obtained by carrying out laser interference.

The focus detection optical system of the displacement detection apparatus according to Japanese Patent Laid-Open No. 2001-76325 determines the origin of the measurement plane by detecting the ratio of the amounts of light incident upon the sensors of the quadripartite sensor. Thus, interference signals are not used.

For this reason, it is difficult to detect position information of the measurement plane at an accuracy of the order of the wavelength.

SUMMARY OF THE INVENTION

The above-identified problems have been taken into consideration to provide an interference measurement apparatus according to embodiments of the present invention. The present invention is capable of setting an origin with high accuracy and measuring displacement (absolute displacement) of an object being measuring with high accuracy.

The interference measurement apparatus according to embodiments of the present invention includes: a first light source configured to emit a first beam having high coherence; a second light source configured to emit a second beam having low coherence; a multiplexing unit configured to multiplex the first beam and the second beam onto the same optical axis to obtain a first multiplexed beam; a beam splitting unit configured to split the first multiplexed beam into a second multiplexed beam and a third multiplexed beam; an interference unit configured to emit the second multiplexed beam obtained at the beam splitting unit to a measurement reflection plane of an object to be measured, to emit the third multiplexed beam obtained at the beam splitting unit to a reference surface, to multiplex the second multiplexed beam reflected from the reflection plane and the third multiplexed beam reflected from the reference surface, and to let the first beam of the second multiplexed beam and the first beam of the third multiplexed beam to interfere with each other and the second beam of the second multiplexed beam and the second beam of the third multiplexed beam to interfere with each other; a light-receiving unit configured to detect a first interference signal obtained from the first beams and a second interference signal obtained from the second beams at the interference unit; and a calculation unit configured to determine the position of a measurement origin from the first and second interference signals obtained at the light-receiving unit.

Other features and advantages of the present invention will be apparent from the following description taken in conjunction with the accompanying drawings, in which like reference characters designate the same or similar parts throughout.

BRIEF DESCRIPTION OF THE DRAWINGS

The accompanying drawings, which are incorporated in and constitute a part of the specification, illustrate exemplary embodiments of the invention, and together with the description, serve to explain the principles of the invention.

FIG. 2 illustrates power spectra of beams LD and SLD according to the first embodiment.

FIG. 6 illustrates the waveforms of an output U interference signal and an output O interference signal according to the first embodiment.

FIG. 9 illustrates the waveforms of an output U interference signal and an output (U+O) interference signal according to a third embodiment.

DESCRIPTION OF THE EMBODIMENTS

First Embodiment

Embodiments of the present invention will be described in detail, by way of example only, in accordance with the accompanying drawings.

According to the embodiments, a low coherence laser beam having a spectral half bandwidth of about 30 nm is multiplexed onto the same optical axis as that of a high coherence laser beam generated by a single mode semiconductor laser. An origin (measurement origin) is determined on the basis of the peak (i.e., peak of amplitude) of the interference output of the low coherence beam and the interference output of the high coherence beam.

In other words, if the spectral width of the low coherence beam is great, the waveform of the interference output of the low coherence beam is substantially the same as that of the interference output of the high coherence beam obtained near where the light path lengths from a reference point to a measurement plane and a reference plane are equal.

When the distances to the measurement plane and the reference plane are equal, the waveform is maximized. Accordingly, the origin is set to a point in synchronization with interference output of the high coherence laser beam.

First Embodiment

Figure 1B:
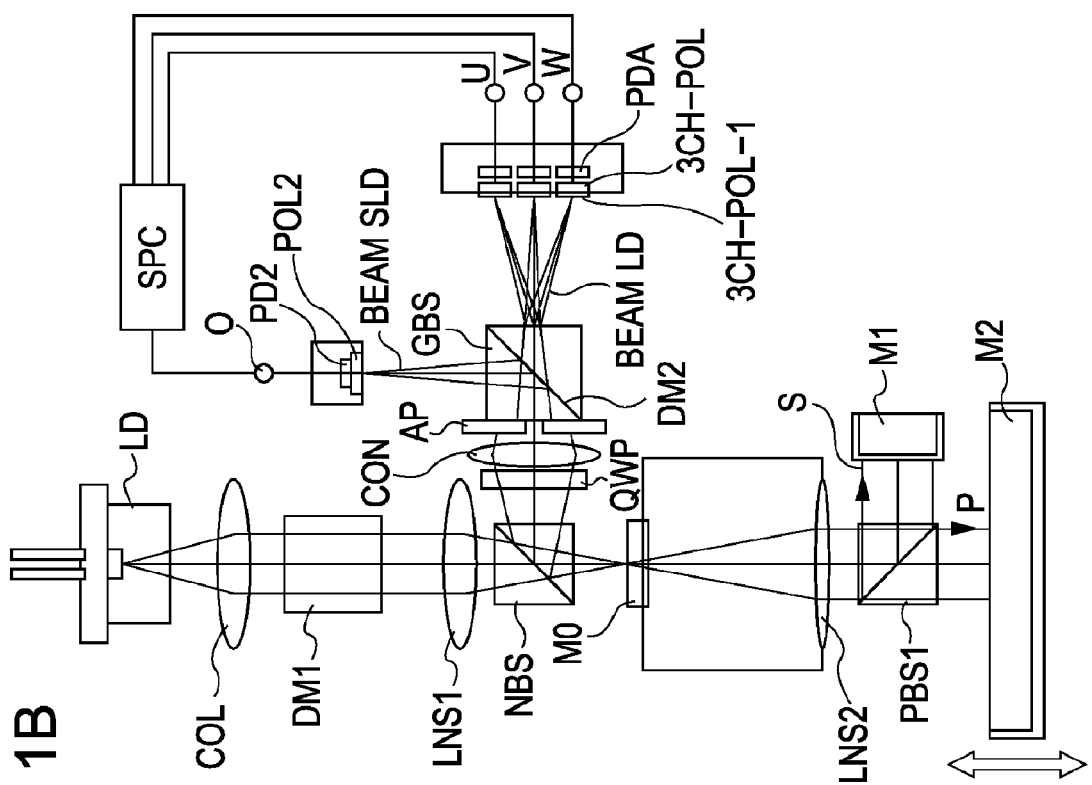
FIG. 1 shows schematic views of the optical arrangement of a first embodiment.
Figure 1A:
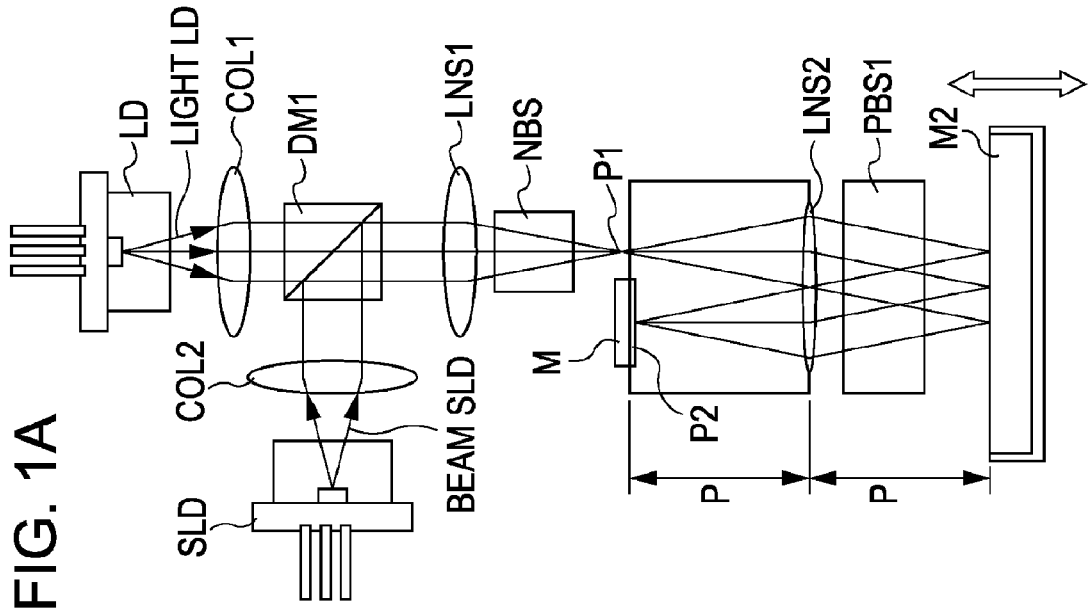

FIGS. 1A and 1B are a side view and a plan view, respectively, illustrating the main components of a first embodiment of the present invention.

A small interference measurement apparatus according to the first embodiment employs an origin detection unit.

As a single-mode semiconductor laser beam LD, a distributed feedback (DFB) laser having a stable oscillation wavelength of 0.78 µm is used.

A linear polarization divergent beam from the semiconductor laser beam LD is collimated at a collimating lens COL1 to obtain a beam (first beam) LD.

A super luminescent diode SLD is also used. This diode SLD emits a beam (second beam) SLD having a central wavelength different from that of the beam LD. More specifically, the beam SLD has a spectral half bandwidth ΔΛ of about 30 nm and a central wavelength of about 0.84 µm.

The beam SLD from the diode SLD is collimated at a collimating lens COL2. The beam LD from the collimating lens COL1 and the beam SLD from collimating lens COL2 are multiplexed onto the same optical axis (i.e., the principal rays of both beams are matched) at a dichroic mirror (multiplexing unit) DM1 and are emitted through a lens LNS1 and a half mirror NBS. Then, the multiplexed beam is condensed to illuminate a position P1 on the focal plane of a lens LNS2.

From the position P1, the multiplexed beam is emitted through the lens LNS2 as a collimated beam having a slightly tilted optical axis. Then, at a polarizing beam splitter (beam splitting unit) PBS1, the multiplexed beam is split into two separate beams on the basis of polarization components. One of the beams (i.e., S polarized beam) reflected at the polarizing beam splitter PBS1 is incident on a reference mirror (reference plane) M1, whereas the other beam (i.e., P polarized beam) transmitted through the polarizing beam splitter PBS1 is incident on a measurement plane (mirror) M2, which is the surface to be measured.

The beams reflected at the reference mirror M1 and the measurement plane M2 are multiplexed at the polarizing beam splitter PBS1 and are condensed to illuminate a position P2 on the focal plane of the lens LNS2. Then, this multiplexed beam is returned to its original light path by a reflective film M0 provided in the vicinity of the position P2.

The multiplexed beam from the position P2 is emitted through the lens LNS2 as a collimated beam and is split into two separate beams at the polarizing beam splitter PBS1. One of the beams (i.e., S polarized beam) reflected at the polarizing beam splitter PBS1 illuminates the reference mirror M1.

The other beam (i.e., P polarized beam) transmitted through the polarizing beam splitter PBS1 illuminates the measurement plane (mirror) M2.

The beams reflected at the reference mirror M1 and the measurement plane M2 are multiplex at the polarizing beam splitter PBS1 and is condensed to illuminate the position P1 on the focal plane on the lens LNS2. Subsequently, the beam is transmitted toward the side of the light source. Here, the S polarized beam is reciprocated between the reference mirror M1 and the polarizing beam splitter PBS1 twice, whereas the P polarized beam is reciprocated between the measurement plane M2 and the polarizing beam splitter PBS1 twice. These beams are transmitted toward the side of the light-receiving system via a non-polarizing beam splitter (half mirror) NBS. Then, each beam is transmitted through a quarter wave plate QWP so as to be converted into a linearly polarized beam in which the polarization direction is rotated in accordance with the change in phase difference.

To separate the beams LD and the beams SLD, the beams are transmitted through a condenser lens CON and an aperture stop AP to a dichroic mirror DM2, having the same structure as that of the dichroic mirror DM1. At the dichroic mirror DM2, the beam LD and the beams SLD are separated by transmitting the beam LD and reflecting the beams SLD.

The beam LD is detected at a LD light-receiving system. More specifically, the beam LD is split into three beams at a beam splitter GBS. The three beams are emitted to light-receiving units of a tripartition light-receiving element PDA via polarizing elements of a polarizing element array 3CH-POL. The polarizing elements of the polarizing element array 3CH-POL have polarization axes different by 60° from each other. In this way, interference signals UVW are detected. The phases of the three interference signals UVW in accordance with the out-of-plane displacement of the measurement plane (mirror) M2 are different by 120°. On the basis of the interference signals UVW, A and B phases having phases different by 90° are determined at a calculation unit from the expressions $A=\frac{2}{3}\times\{U-(V+W)/2\}$ and $B=1/\sqrt{3}\times(V-W)$, respectively.

The beam SLD reflected at the dichroic mirror DM2 is detected at an SLD light-receiving system. More specifically, the beam SLD is emitted at a light-receiving element PD2 through a polarizing element POL2. Then, when the light path lengths to the measurement plane M2 and the reference mirror M1 are similar, an interference signal O is output.

A polarizing element 3CH-POL-1 of the polarizing element array 3CH-POL corresponding to the output interference signal U and the polarizing element POL2 corresponding to the beam SLD are disposed so that their polarization directions are set in directions that enable peak values to be achieved when the light path difference of the measurement plane M2 and the reference mirror M1 is zero. Consequently, the output interference signal U and the A phase are cosine waves having origins at points where the light path difference of the measurement plane M2 and the reference mirror M1 is zero.

The O output signal also has an origin at a point where the light path difference of the measurement plane M2 and the reference mirror M1 is zero and is a cosine wave that attenuates as moving further away from the origin.

The members provided in the light paths from the measurement plane M2 and the reference mirror M1 to the light-receiving elements PD2 and PDA constitute an element in the interference unit.

FIG. 2 illustrates power spectra of the beam LD from a semiconductor laser LD and the beam SLD from a diode SLD.

The power spectrum of the beam LD from the semiconductor laser LD is an emission line at 0.78 μm. The power spectrum of the beam SLD from the diode SLD is similar to a Lorentz type power spectrum in which the central wavelength is 0.84 μm and the half bandwidth is 30 nm. A power spectrum $S(\Delta\lambda)$ corresponding to the wavelength difference $\Delta\lambda$ from the central wavelength 0.84 μm of the beam SLD is represented by the following expression:

$$S(\Delta\lambda)=(\Delta\Lambda/2)2/\{\Delta\lambda2+(\Delta\Lambda/2)2\} \quad (1)$$

where, $\Delta\Lambda$A represents the half bandwidth, which is 30 nm in this case.

Based on FIG. 2, the dichroic mirrors DM1 and DM2 are set to have boundaries of transmission and reflection characteristics around 0.8 μm. Accordingly, the dichroic mirror DM1 is capable of multiplexing beams and the dichroic mirror DM2 is capable of splitting a beam.

The interference signals UVW obtained from the semiconductor laser LD have sufficiently high coherence. The coherence and the visibility V ($\Delta V1$) of the interference signals O obtained from the diode SLD can be approximated by applying the following expression that is derived by carrying out inverse Fourier transformation to expression 1:

$$V(\Delta V1)=\text{Exp}\{-\pi\Delta\Lambda/\lambda2\}\Delta V1 \quad (2)$$

where, λ represents the central wavelength of the beam SLD, which is 0.84 μm in this case, and $\Delta V1$ represents the light path length difference.

Figure 3:
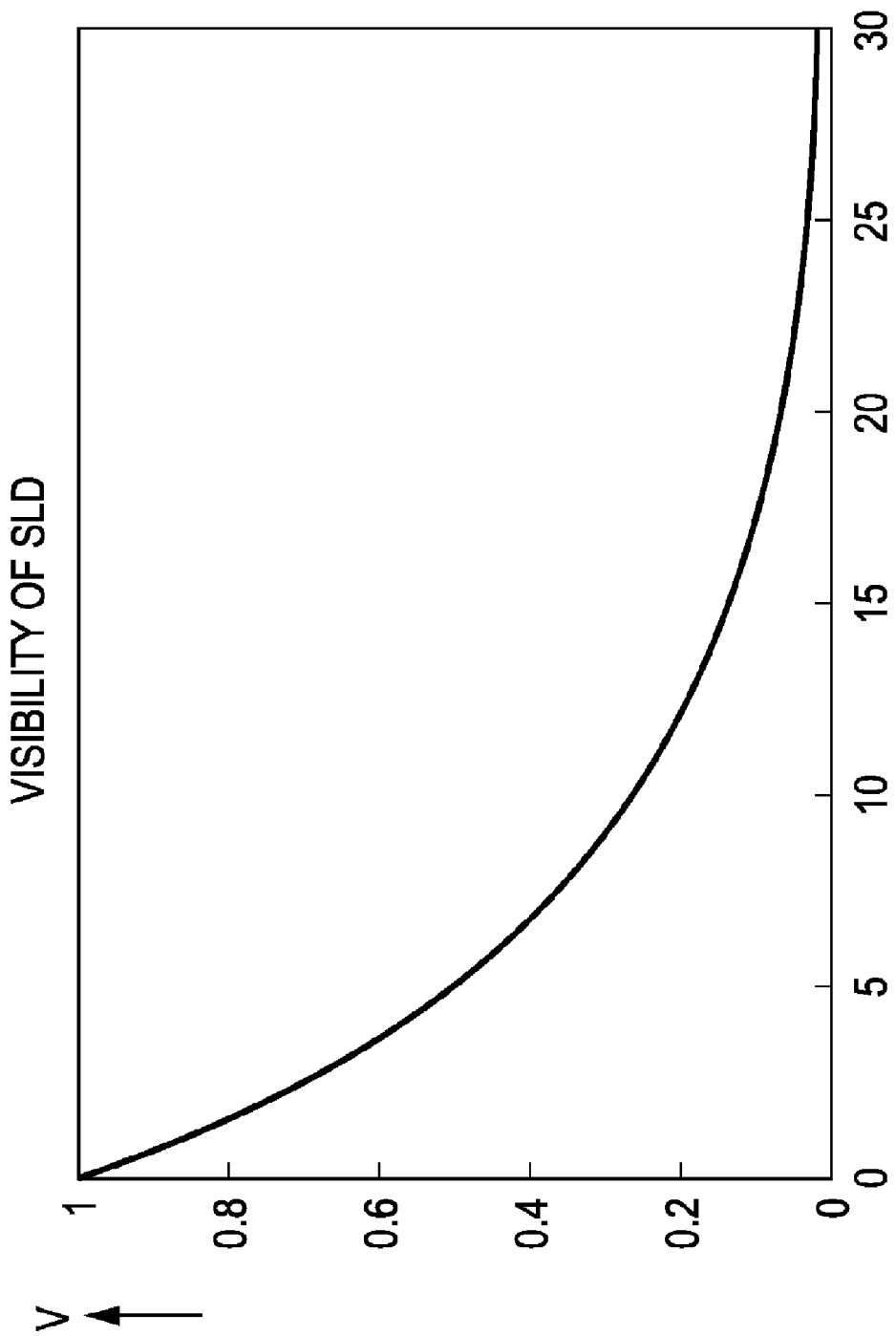
FIG. 3 illustrates the visibility of the beam SLD according to the first embodiment.

FIG. 3 illustrates the relationship between the light path length difference $\Delta V1$ and the visibility V.

Figure 4:
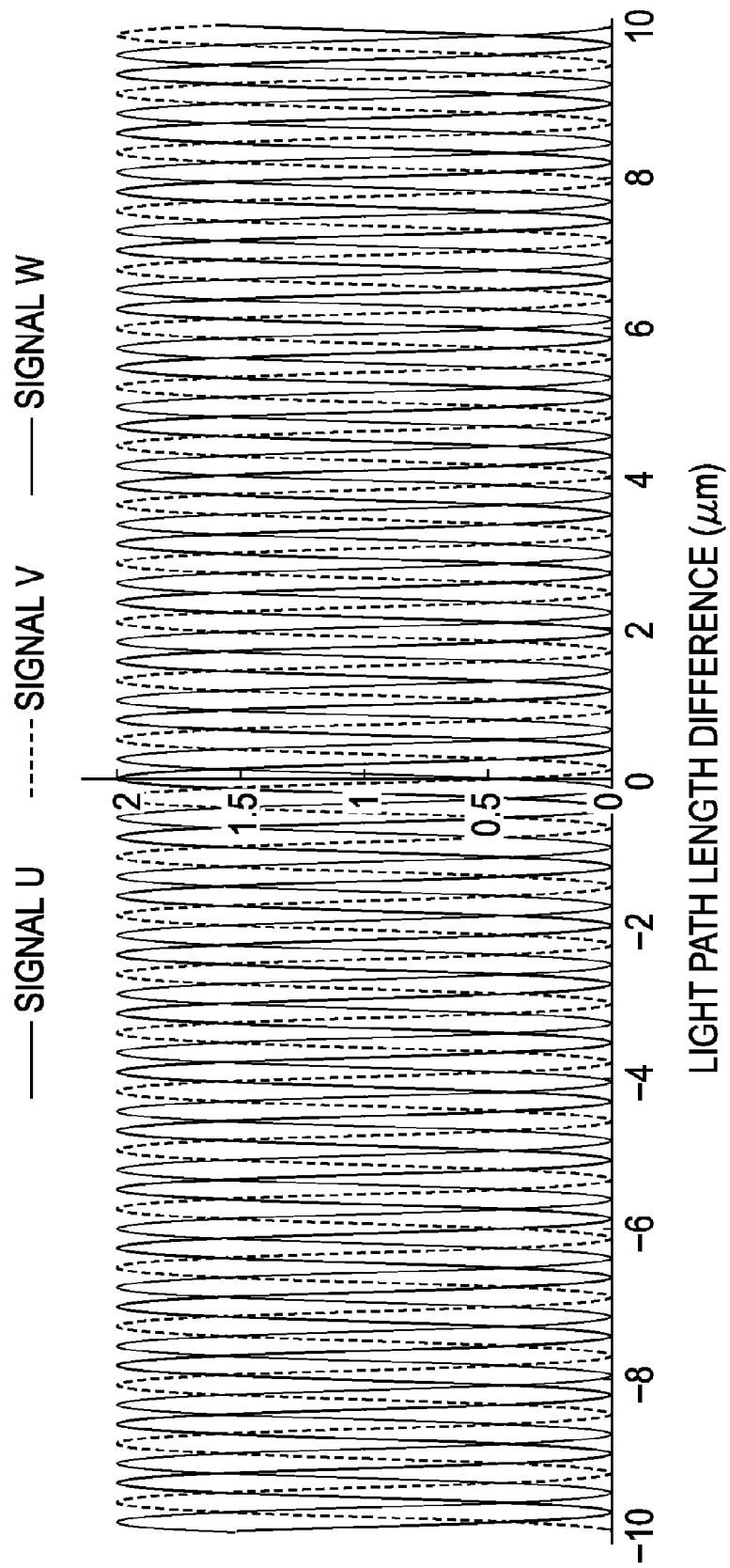
FIG. 4 illustrates the waveforms of output UVW interference signals according to the first embodiment.
Figure 5:
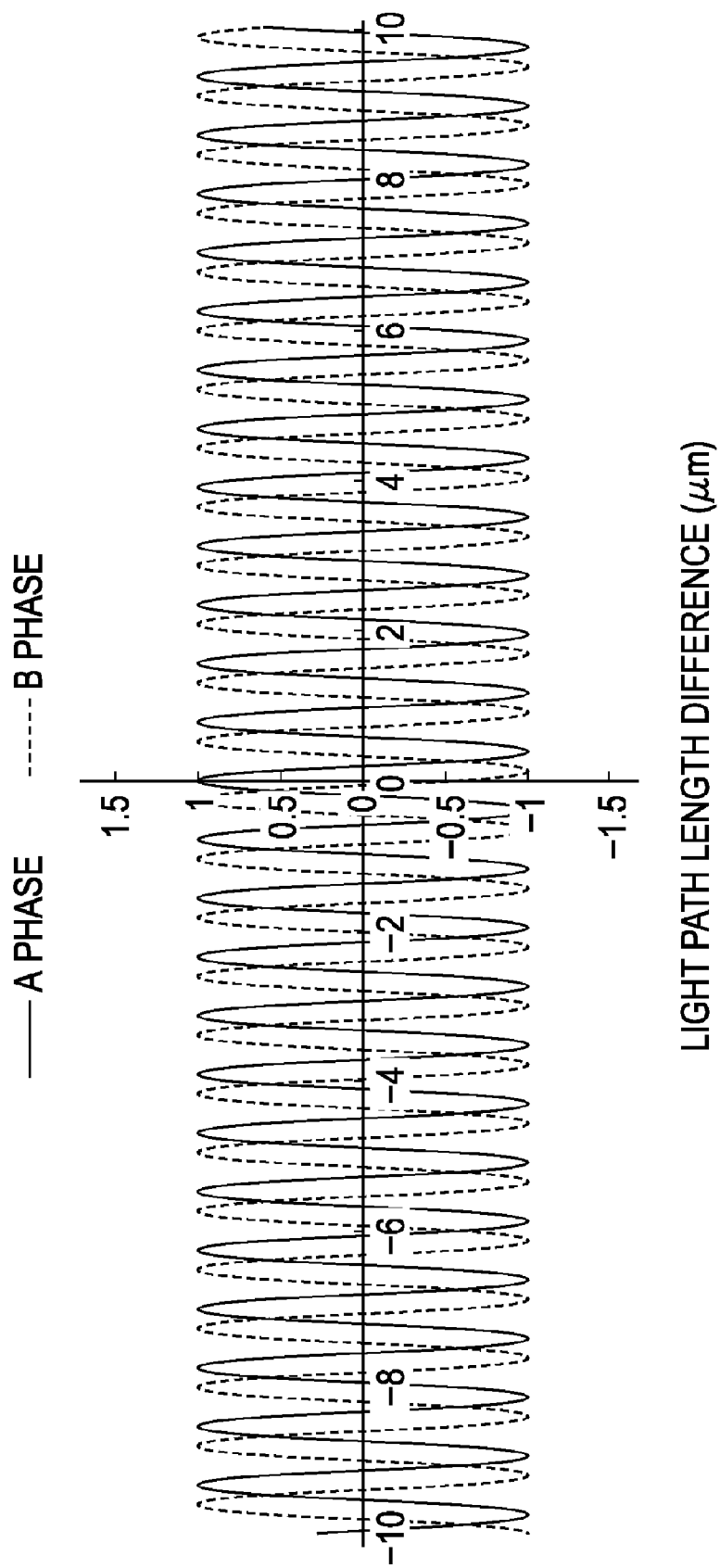
FIG. 5 illustrates A and B phases calculated from the output UVW interference signals according to the first embodiment.

FIG. 4 illustrates the interference signals UVW from the semiconductor laser LD received at the light-receiving element PDA. FIG. 5 illustrates A and B phases generated from the interference signals UVW and having phases difference by 90°. FIG. 6 illustrates the interference signal O obtained at the light-receiving element PD2 when the light path lengths are similar, and the interference signal U from the semiconductor laser LD. The horizontal axis of FIG. 6 represents the light path length difference between the measurement plane M2 and the reference mirror M1. Since the beams are reciprocated two times, the displacement of the measurement plane M2 is ¼. As shown in the drawing, when the light path lengths are equal (i.e., when the light path difference is zero), the interference signal O demonstrate substantially the same cosine curve as the interference signal U from the semiconductor laser LD. Therefore, the peak of the interference signal O is greater than the adjacent peak, enabling detection.

Accordingly, by detecting the peak of the interference signal O from the diode SLD, an origin in synchronization with the interference signal V from the semiconductor diode LD is defined with high accuracy.

Instead of defining the origin according to the peak value of the interference signal O, the origin may be defined on the basis of the relationship between a predetermined value and the interference signal B.

The 90'-different A and B phases of the interference signals UVW from the semiconductor laser LD are based on the principle of an interferometric measurement by a double reciprocal light path. Therefore, interference signals are sine wave signals having a signal period of ¼ of the wavelength of the interference signal U from the semiconductor laser LD.

When a laser diode SLD having a wavelength of 0.78 μm is used, a sine wave signal having a period of 0.195 μm is obtained. The wave number is counted and the phase is calculated by $\tan^{-1}$ (B/A) to detect the relative displacement with a resolution on the order of nanometers.

By resetting the counted wave number at a peak of the interference signal O from the diode SLD, the absolute value of the origin can be measured on the order of nanometers.

As described above, according to the first embodiment, the interference signal generated from the beams LD and from the beams SLD at the interference unit are detected the light-receiving unit.

A position where the light path length from the polarizing beam splitting unit PBS1 to the measurement plane M2 and the reference mirror M1 are equal is determined as a measurement origin for displacement information on the basis of the interference signals obtained at the light-receiving unit to obtain absolute displacement information.

More specifically, from the intensity information of the interference signal generated at the light-receiving unit PD2, the position where the light path length from the polarizing beam splitting unit PBS1 to the measurement plane M2 and the reference mirror M1 are equal is set on the basis of the period of the interference signal obtained at the light-receiving unit PDA. Then, absolute displacement information is determined according to the measurement origin for displacement information.

Second Embodiment

Figure 7B:
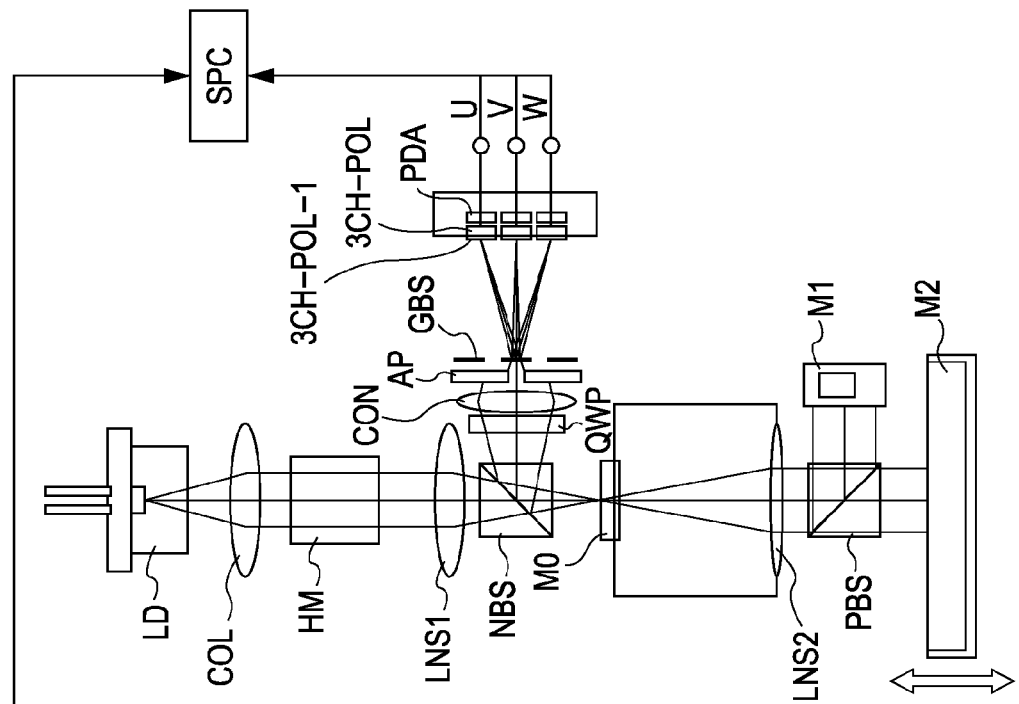
FIG. 7 shows schematic views of the optical arrangement of a second embodiment.
Figure 7A:
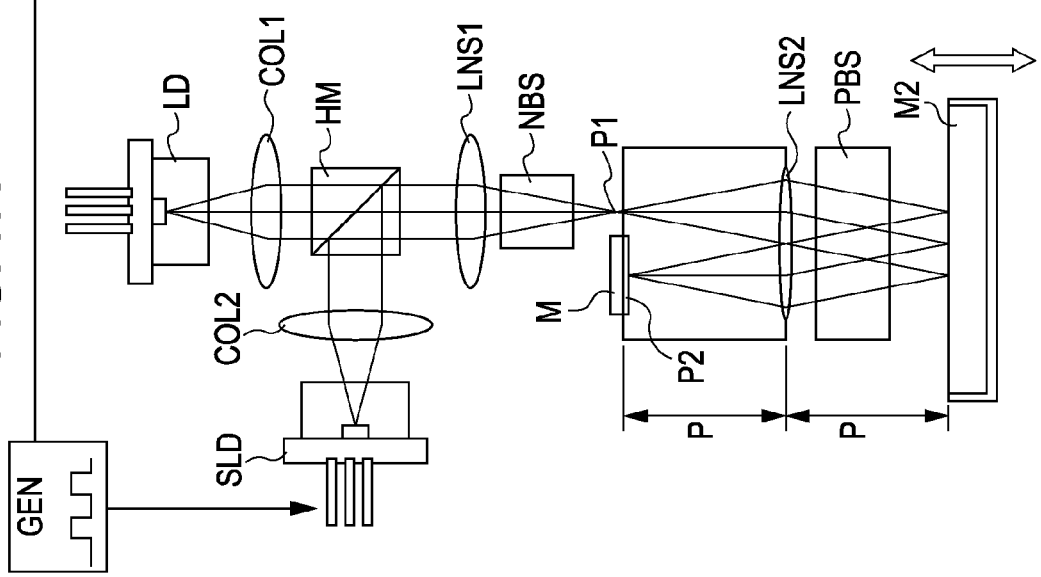

FIG. 7 illustrates a schematic view of the main components of a second embodiment of the present invention. The differences of the second embodiment and the first embodiment are listed below.

(a) The semiconductor laser LD and the diode SLD are alternately turned on and off while the origin is being detected.

(b) The polarization element array 3CH-POL and the tri-partition light-receiving elements PDA are included in both the SLD light-receiving system and the LD light-receiving system for receiving the interference signal from the semiconductor laser LD. As the interference signal O from the beam SLD, a signal from a light-receiving element PDA-1, which corresponds to the interference signal U, in the tripartition light-receiving element PDA (including elements PDA-1, PDA-2, and PDA-3) is used.

The interference signals UVW from the beam LD and the interference signals O from the beam SLD are sampled and separated at a signal processing unit SPC in accordance with illumination. While the interference signals are not emitted, interpolation and estimation are carried out to obtain the interference signals UVW from the LD and the interference signals O continuously.

Figure 8:
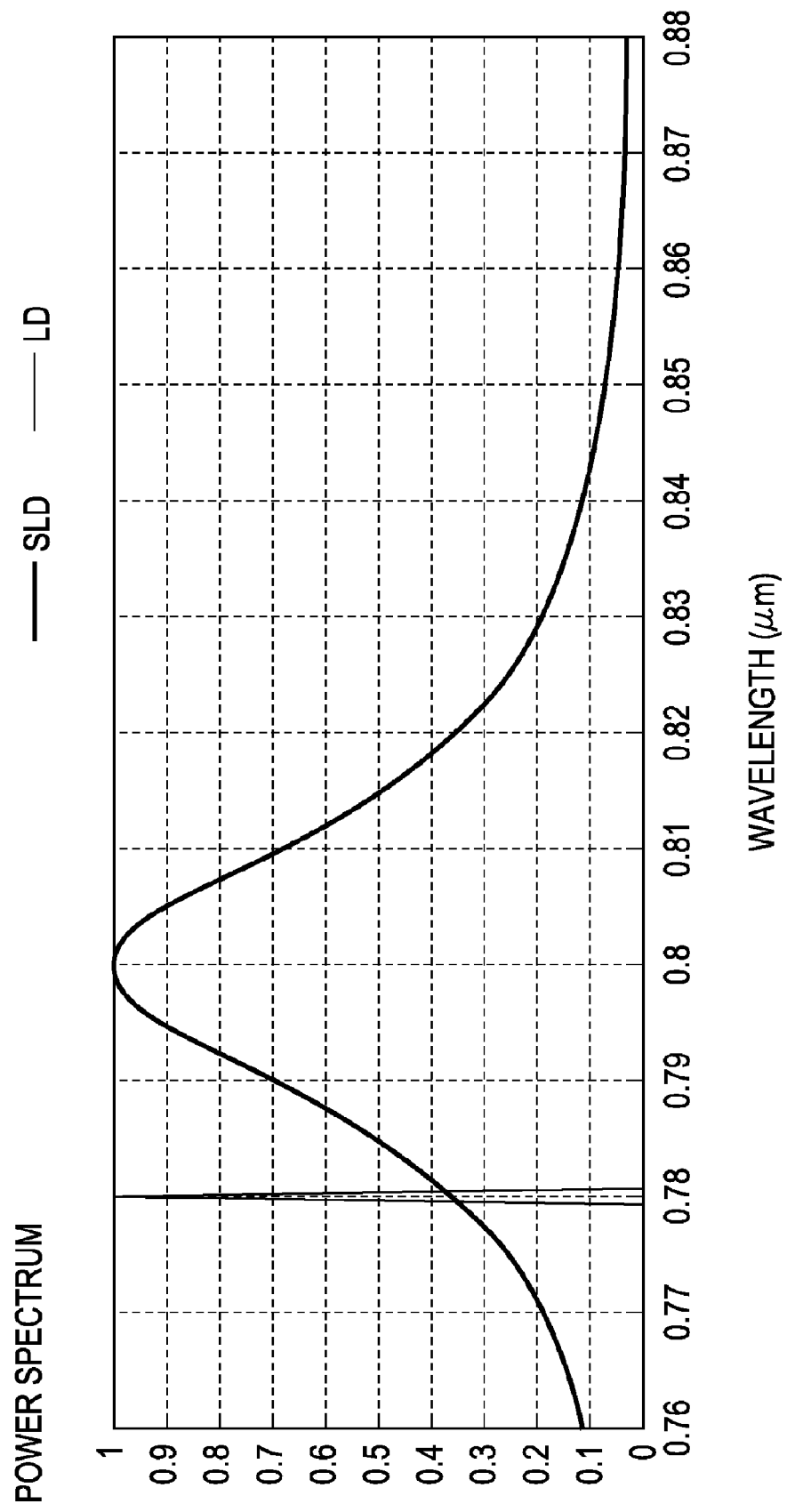
FIG. 8 illustrates power spectra of beams LD and SLD according to the second embodiment.

(c) The signals do not have to be separated by wavelength. As the power spectra of the beams LD and SLD shown in FIG. 8, by reducing the wavelength difference between the beams LD and SLD, the difference in the characteristics of, for example, the polarizing beam splitter PBS, caused by the wavelength can be reduced. Therefore, a half mirror is used as a multiplexing unit HM.

The origin is defined in synchronization with the interference signals from the beam LD, in the same manner as the first embodiment, on the basis of the interference signals O from the beam SLD and the interference signals UVW from the beam LD obtained as described above.

According to the second embodiment, since sampling is carried out in time series by turning on and off the beam SLD when detecting the origin, the movement of the measurement plane M2 has to be sufficiently faster than the sampling frequency.

In general, the movement of the measurement plane M2 is slower than the electric sampling so long as the movement of the measurement plane M2 is a mechanical movement. Thus, detection of the origin is easy.

Third Embodiment

The structure according to a third embodiment of the present invention is substantially the same as that illustrated in FIG. 7.

According to the third embodiment, instead of alternately turning on and off the driving of the semiconductor laser LD and the diode SLD when the origin is being detected, the semiconductor laser LD is constantly turned on. The semiconductor laser LD is matched with the on and off of the driving of the diode SLD.

More specifically, the interference signals UVW from the beam LD is obtained when the diode SLD is turned off.

When the diode SLD is turned on, a signal obtained by superimposing the interference signals UVW from the semiconductor laser LD and the interference signals O from the diode SLD is sampled and separated at the signal processing unit SPC. Interpolation and estimation is carried out on the interference signals to obtain continuous interference signals UVW and a signal obtained by superimposing the interference signals O on the interference signals UVW.

FIG. 9 illustrates the waveforms of the signal U of the continuous interference signals UVW obtained by interpolation and estimation and the signal (U+O) of the interference signal obtained by superimposing the interference signals O on the interference signals UVW near a position where the light path from the polarizing beam splitting unit PBS to the measurement plane M2 and the reference mirror M1 are equal.

The origin is defined, in the same manner as that according to the first embodiment, in synchronization with the interference signal V from the semiconductor diode LD on the basis of the signal (U+O) obtained by superimposing the interference signals O from the beam SLD on the interference signals UVW from the beam LD and the interference signals UVW from the beam LD.

According to the third embodiment, the semiconductor laser LD is constantly illuminated. However, as an alternative, the diode SLD may be constantly illuminated, and the semiconductor laser LD may be turned on and off.

It is desirable to maintain the temperature of the semiconductor laser LD so as to stabilize the laser oscillation.

However, if the semiconductor laser device is turned on and off, the temperature of the light-emitting unit of the semiconductor laser device changes due to thermal resistance of the semiconductor laser device when turned on. Thus, the single-mode laser oscillation may be unstable. Therefore, as described in the third embodiment, it is desirable to constantly illuminate the semiconductor laser LD.

As described above, according to the third embodiment, two different light sources are alternately turned on and off. In accordance with the illumination of the beams LD and SLD, the interference beams are received by the light-receiving unit. The waveforms of the interference signals are interpolated and estimated on the basis of the beams LD and SLD received at the light-receiving unit. In this way, the measurement origin is defined at a position where the light path lengths from the measurement plane M2 and the reference mirror M1 to the polarizing beam splitter PBS are equal.

Instead, only one of the two light sources (first and second light sources) may be turned on and off. In such a case, an interference beam is detected from a beam from the first light sources while the second light source is turned off. An interference beam having a signal obtained by superimposing the interference signal from the beam SLD to the interference signal from the beam LD is received at the light-receiving unit while the second light source is turned on. The waveform of the interference signal based on a beam from the first or second light source, whichever is being turned on, is interpolated and estimated. In this way, the measurement origin is defined at a position where the light path lengths from the measurement plane M2 and the reference mirror M1 to the polarizing beam splitter PBS are equal.

According to the embodiments described above, the super luminescent diode SLD is used as a light source of the low coherence interference beam. The power spectrum of this beam is similar to a Lorentz type power spectrum but is not exactly the same. Therefore, in such a case, the visibility and the envelope curves of the interference signals O are also different.

However, the greater the half bandwidth of the power spectrum is, the greater the peak of the origin (i.e., peak amplitude) is compared to the adjacent peak. Thus, detection is easier, whereas detection is more difficult when the half bandwidth of the power spectrum is small. The power spectrum enables the detection of the peak (i.e., peak of amplitude) when the light path lengths to the measurement plane M2 and the reference mirror M1 of the low coherence beams are equal.

As a small light source for the low coherence interference beam, a current constriction type point light source light-emitting diode may also be used although the directionality is wide and the use efficiency of light is low.

The embodiments may also be applied to a gas laser interference measurement apparatus using a mirror or a corner cube for the object to be measured. As a light source of a low coherence beam, a xenon lamp or a white point light source constituting a pin hole may also be used.

Instead of the DFB laser diode, a single mode surface-emitting semiconductor laser, e.g., a vertical cavity surface-emitting laser (VCSEL), controlled at a constant temperature or a gas laser, such as a helium-neon (He—Ne) laser, may be used.

According to the above-described embodiments, the origin can be defined at a resolution on the order of nanometers in synchronization with an output sine wave of laser interference.

Accordingly, it is easy to obtain absolute position information at a resolution on the order of nanometers.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-218980 filed Jul. 28, 2005, which is hereby incorporated by reference herein in its entirety.

What is claimed is:

1. An absolute position measurement apparatus comprising:
   a first light source configured to emit a first beam having high coherence;
   a second light source configured to emit a second beam having low coherence;
   a multiplexing unit configured to multiplex the first beam and the second beam onto the same optical axis to obtain a first multiplexed beam;
   a polarization beam splitting unit configured to split the first multiplexed beam into a second multiplexed beam and a third multiplexed beam, and to multiplex the second multiplexed beam reflected from a measurement reflection plane of an object and the third multiplexed beam reflected from a reference surface;
   a wave plate allowing the first beam of the second multiplexed beam and the first beam of the third multiplexed beam to interfere with each other, and allowing the second beam of the second multiplexed beam and the second beam of the third multiplexed beam to interfere with each other;
   a light-receiving unit configured to detect a first interference beam obtained from the first beams and a second interference beam obtained from the second beams; and
   a calculation unit configured to determine the position of a measurement origin from a first and second interference signals obtained from the first and second interference beams at the light-receiving unit and to obtain the absolute position of the object on the basis of the position of the measurement origin.

2. The absolute position measurement apparatus according to claim 1, wherein the position of the measurement origin is the position where the light path lengths from the polarization beam splitting unit to the measurement reflection plane and the reference plane are equal.

3. The absolute position measurement apparatus according to claim 1, wherein the light-receiving unit includes,
   a first light-receiving sub-unit configured to detect the first interference signal obtained from the first beams, and
   a second light-receiving sub-unit configured to detect the second interference signal obtained from the second beams.

4. The absolute position measurement apparatus according to claim 3, wherein the calculation unit determines a position where the light path lengths from the polarization beam splitting unit to the measurement reflection plane and the reference plane are equal, on the basis of information on the intensity of the second interference signal obtained at the second light-receiving unit and the periodic signal of the first interference signal obtained at the first light-receiving unit, the position being determined as a measurement origin for displacement information.

5. The absolute position measurement apparatus according to claim 1, wherein the central wave lengths of the first beam emitted from the first light source and that of the second beam emitted from the second light source are different.

6. The absolute position measurement apparatus according to claim 1, wherein the first and second light sources are configured to turn on and off alternately, and the calculation unit is configured to interpolate and estimate the waveforms of the first and second interference signals obtained from the first and second interference beams and to determine the position of the measurement origin from the interpolated and estimated signals.

7. The absolute position measurement apparatus according to claim 1, wherein one of the first and second light sources is configured to turn on and off, and the calculation unit is configured to interpolate and estimate the waveforms of one of the first and second interference signals detected at the light-receiving unit while one of the light sources is turned off and the waveforms of the superimposed interference signal of the first and second interference signals detected at the light-receiving unit while both the first and second light sources are turned on and to determine the position of the measurement origin from the interpolated and estimated signals.

8. The absolute position measurement apparatus according to claim 1, wherein the light-receiving unit comprise a plurality of the light-receiving elements, each of the light-receiving elements receiving the first interference signals whose phase is different from each other.

9. The absolute position measurement apparatus according to claim 3, wherein the first light-receiving sub-unit comprise a plurality of the light-receiving elements, each of the light-receiving elements receiving the first interference signals whose phase is different from each other.

* * * * *